United States Patent [19]

Rosseel et al.

[11] Patent Number: 4,501,008

[45] Date of Patent: Feb. 19, 1985

[54] DEVICE FOR ELECTRONICALLY CONTROLLING LOOM COMPONENTS

[75] Inventors: Henri J. Rosseel, Ieper; Filip N. Deconinck, Zwevegem, both of Belgium

[73] Assignee: N.V. Weefautomaten Picanol, Belgium

[21] Appl. No.: 385,078

[22] Filed: Jun. 4, 1982

[30] Foreign Application Priority Data

Jun. 17, 1981 [BE] Belgium .................................. 59214
Sep. 10, 1981 [EP] European Pat. Off. ......... 81201008.0

[51] Int. Cl.³ .......................................... D03D 51/00
[52] U.S. Cl. .......................................... 377/2; 377/16; 139/1 R
[58] Field of Search ................. 377/2, 16; 139/1 R; 66/232

[56] References Cited

U.S. PATENT DOCUMENTS

| | | | |
|---|---|---|---|
| 3,570,550 | 3/1971 | Budzyna | 139/336 |
| 3,896,638 | 7/1975 | Gottschall et al. | 66/50 R |
| 4,192,243 | 3/1980 | Blessing et al. | 112/273 |

Primary Examiner—John S. Heyman
Attorney, Agent, or Firm—Bacon & Thomas

[57] ABSTRACT

Device for electronically controlling pneumatic thread tensioners or other related components of looms of the kind comprising a cam, the motion of which is synchronized in relation to the rotation of the crankshaft of the loom and which produces a signal by means of an electronic detector, characterized in that it also comprises a generator of electric impulses which is excited by the aforesaid signal for emitting a train of impulses with an adjustable frequency by means of which per operational cycle, is being effected the control of the concerned components of the machine.

5 Claims, 2 Drawing Figures

DEVICE FOR ELECTRONICALLY CONTROLLING LOOM COMPONENTS

BACKGROUND OF THE INVENTION

The present invention relates to a device for electronically controlling loom components such as, for instance but not exclusively, the components for inserting the woof.

The invention, in particular, relates to a device of the kind defined hereinabove essentially made up of a system of coding and programming means. A number of examples of execution of such systems are already known. They are generally composed of similar or equivalent programming means, but show clear, differences in the coding system.

For instance, in the Dutch patent application No. 7511121 is described a controlling device, characterized in that the coding is carried out on the crankshaft of the loom through electronic events. Now, the controlling devices that are particularly suited for equipping rapier looms, are not suited for equipping other looms, such as looms in which the insertion of the woof thread is being carried out pneumatically, through projection or by means of a shuttle.

The German patent application DAS No. 28 36 206 recommends use of purely mechanical code system, allowing the reading of angle degrees on the crankshaft. This solution, which as the preceding ones excellently suits the equipment of rapier looms, shows appreciable drawbacks in looms without mechanical coupling of the woof thread insertion component, such as are the looms with pneumatic insertion of the woof thread.

One of the great difficulties in the projection looms, and above all in the pneumatic looms, lies in the fact that the insertion of the woof thread into the opening of the warp depends on a number of factors which, on the whole, are independent of the angular position of the crankshaft, such as the reaction time of the valves, the pressure increase in the nozzles, etc.

The fact that the control of the nozzles in a pneumatic loom poses problems which are difficult to resolve is clearly illustrated by the great number of solutions recommended to date, i.e. the U.S. Pat. Nos. 3,705,608 and 3,821,972, the Dutch Pat. No. 7901050; and the English Pat. No. 1,470,752 etc.

SUMMARY OF THE INVENTION

Now, the present invention proposes an adequate and effective solution to these problems that is particularly suited to the control of projection looms and pneumatic looms.

Therefore, the invention provides for an electronic controlling device comprising an adjustable cam, the motion of which is synchronous with that of the crankshaft of the loom and which produces an enabling signal for an electric pulse generator, in order to produce a train of control the mechanical components of the machine.

Accordingly, there is provided a totalizer (counting shift registers) and a strappable conductor matrix for the free selection of pulse counts from the aforesaid train of pulses, wherein the pulse counts correspond to intervals for timing the actuation of machine components in the overall duty cycle, either directly through the intervention of other electronic devices such as latch memories.

BRIEF DESCRIPTION OF THE DRAWINGS

The invention is illustrated in FIGS. 1 and 2 as alternate and closely related embodiments of loom control circuitry.

DETAILED DESCRIPTION

Figure 1:
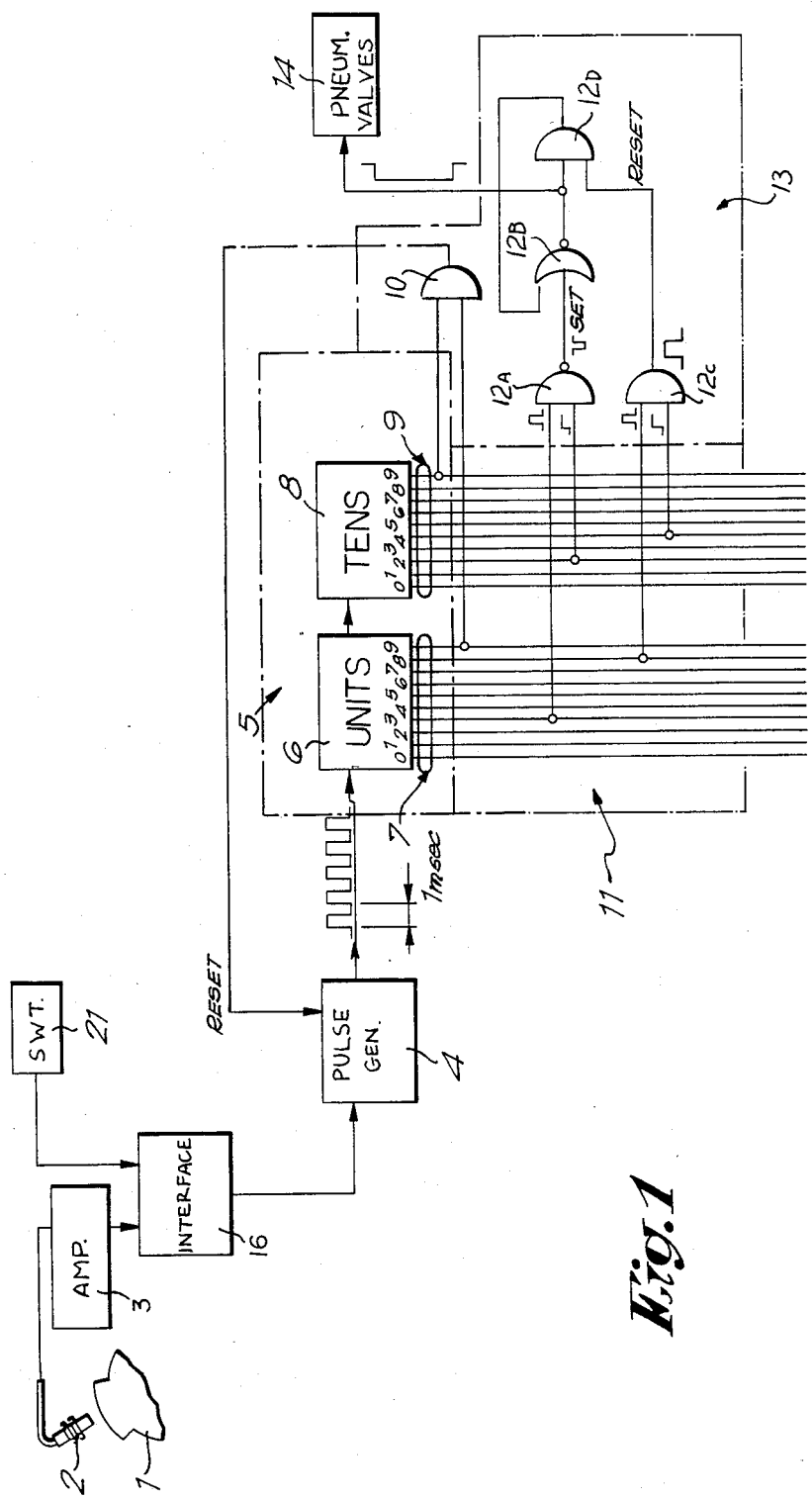

In FIG. 1, the main crankshaft of the loom or a secondary shaft rotating in synchronism therewith carries a cam 1 with which cooperates a magnetic or equivalent detector (proximity switch) 2, whose switch positions correspond to the opening and the closing of a distance to a metallic object, which is the cam lobe 1. The detector 2, equipped with an electronic circuit, thus emits a pulse at each revolution of the crankshaft, thereby enabling an electronic pulse train generator 4 through the interposition of an amplifier 3 and a suitable interface circuit 16. There may also be provided a manual control device 21, such as a keyboard of simple switcher in order to enable or alter the pulse rate of said generator 4. However, for all purposes heretoforth, the frequency of these pulses, or pulse rate, shall be 1000 Hz.

This signal duly profiled is sent to a totalizer 5 consisting of a serially connected bank of counters 6 and 8. The parallel outputs of these overflow counters can be earmarked in decimal numbers. The first counter 6 can thus be thought of as "ones" where such units are milliseconds counted from the enabling of the pulse generator 4. Thus, each of the ten output lines 7 of the units counter 6 is at a high level (voltage) for one msec. as consecutive counting of incoming pulses takes place. So, line 2 is at a high level between the second and third pulses received—line 3—being at a high level between the third and fourth pulses, and so forth.

Every tenth pulse from counter 6 is transmitted to a second decade counter which represents consecutive 10–8, millisecond counts.

The outputs 7 of the decade counter 6 thus corresponds with the units, and the outputs 9 of the decade counter 8 correspond with the tens when counting the pulses of the square-wave pulse generator 4.

When two decade counters are thus deployed the counting is limited to 100 pulses—actually which milliseconds number is sufficient for most applications.

The stopping of the pulse train is controlled by a stop signal sent as soon as count 99 is reached in 6 and 8.

The ninth output of the decade counter 6 and the ninth of the decade 8 are sent through a fixed connection to a logical AND gate 10, the output of which is high only as long as both lines are at their high level. The output signal of gate 10 is the means to stop the pulse generator 4, which is reactivated or cleared after the following revolution of the cam 1 and the signal emitted by the detector 2.

The output lines 7 and 9 of the totalizer 5 are, as far as the vertical connections are concerned, introduced into a matrix 11 of conductors, wherein the horizontal output lines may be connected, or strapped, selectively at the crossing points in a known manner, such as by means of a contact pin.

The horizontal matrix outputs form the inputs of logic, circuits which are activated at the arrival of a determined impulse of the pulse generator 4 through selection of the output specific individual lines 7 and 9 of the totalizer 5.

For instance, the connection-designation on the pulse 23 (23 msec) means that the second output line of the decade counter 8 has been selected, which provides the voltage required between the pulses 20 and 30, and the third output line 3 of the decade counter 6, which is at its high level between the third and fourth impulse.

The simultaneous elevation in voltage of both those lines connected as inputs to NAND gate 12A makes this active in a low state (negative pulse).

Thus, the regulation signal of a bistable memory latch circuit 13 (the setting back to zero of which is carried out in another point designated 48 at will given the requirements of the machine) can be selected at will, and a controlling signal that controls further electronic circuits or that puts under pneumatic pressure, by means of an amplifier and set of magnetic valves 14, the main blower or auxiliary blowers intended for inserting the woof threads, may be derived. In FIG. 1, the output of OR gate 12B controls this external loom-component(s) actuator circuit 14, and it can be readily seen how this signal may be cut off at the count (e.g., "48") selected through the action of gates 12C and 12D.

Figure 2:
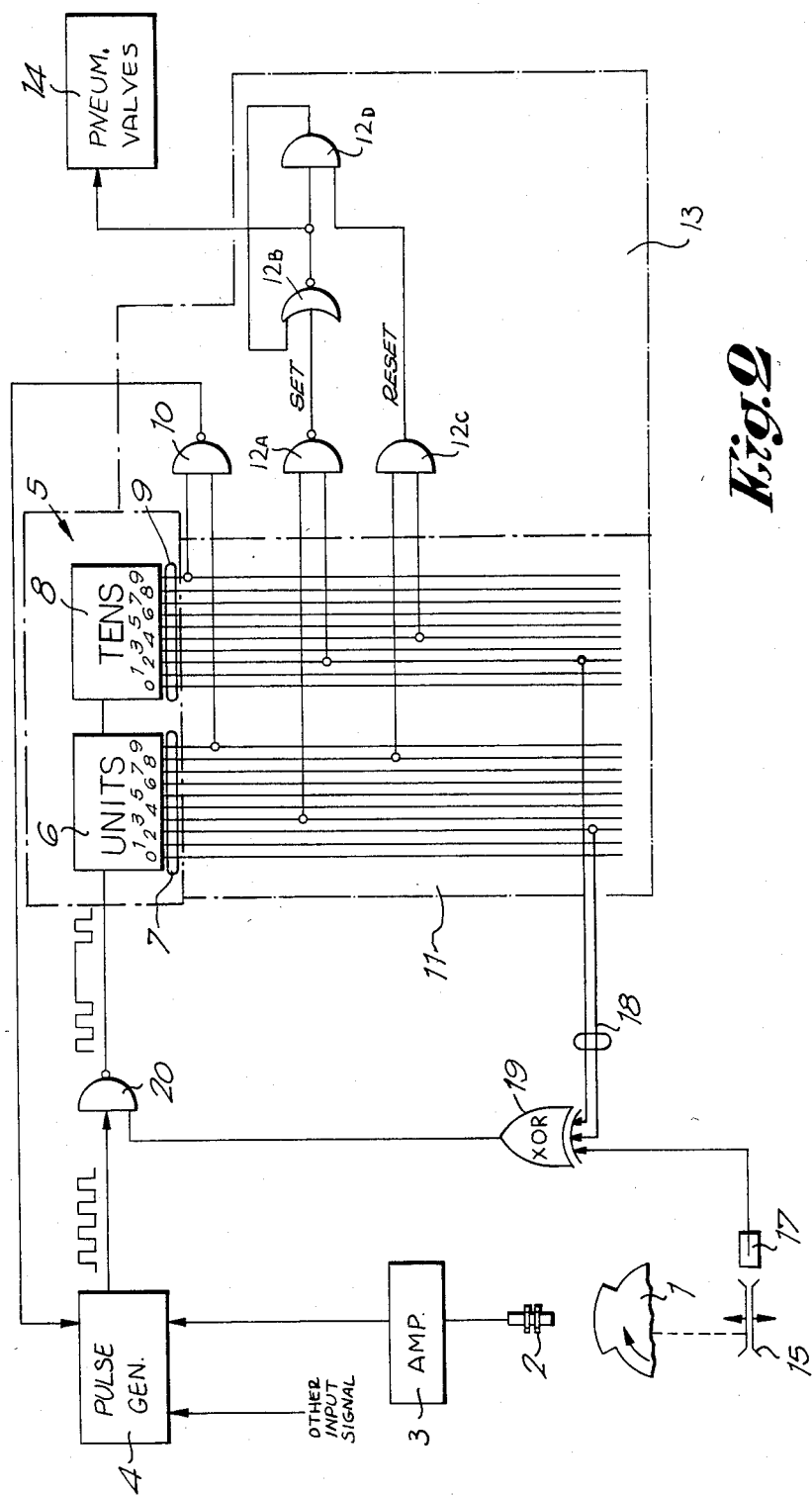

The insertion of the woof thread commences as soon as the braked thread 15 of the loom is released. Referring now to FIG. 2, the brake is a mechanical brake 15, generally controlled by a cam 1, that moves in synchronism with the main shaft of the loom.

At the time of the releasing of the brake 15 a sufficient pneumatic pressure must be present in the main blower and, maybe, in the auxiliary blowers, and so the emission of the pulse train for controlling the excitation of these electric or magnetic air valves 14 commences at a time that precedes the releasing of the brake 15.

The characteristics of the air valves themselves are the ones that determine the duration in milliseconds, and thus the excitation time that must elapse until the thread brake 15 opens. This is the reason the emission of the pulse train from generator 4 commences a few milliseconds before the mechanical brake 15 is opened. Therefore, this number ought to be greater at the first insertion of the woof thread, if the start is slow, which should cause a delay of a few milliseconds for the opening of the mechanical brake. Without any compensatory mechanism, there would result a certain shift of the programmed response of the machine due to this slowed down insertion, requiring an increase of the consumption for the first woof insertion machine cycle in comparison with following cycles in order to ensure an optimal insertion operation overall.

This drawback can be avoided by adequately configuring the matrix 11 to a basic number that corresponds with the number of milliseconds (or number of one-msec. pulses) which are to elapse until the brake 15 opens and the woof thread is inserted (for instance 22 milliseconds).

The output signal on lines 18 of the totalizer 5, detecting the coincidence of the units and tens of the selected number, is sent along with the signal of the actual opening of the brake 15 of the woof thread via detecter 17 to an XOR gate 18, the output of which is one of the essential components of the coincidence circuit or AND gate, 20 connected between the pulse generator 4 and totalizer 5.

If the input to gate 19 produced as the aforesaid basic number 22, arrives *earlier* than the one relating to the opening of the woof thread brake, the train of pulses emitted by the pulse generator 4 is *not* transmitted to the decode counters 6 and 8, which remain locked on the previously selected number. But, as soon as the detector 17 emits a signal relating to the opening of the woof thread brake 15, the blocking signal is suppressed and the pulse train can continue controlling the count in the totalizers 5.

An extension of the circuit described in the preceding lines, which is also capable of detecting the premature arrival of the signal of synchronism of the woof thread brake (insufficient number of "fore" impulses, unitary time too long) alows to bring into play the system as an adjustment means, with a possibility of visualizing the exact adjustment of the coincidence between the selected number of impulses and signal of opening of the woof thread brake by means of a luminous (LED) red or green diode.

What we claim is:

1. A device for generating electronic control signals for a pneumatic projecting loom comprising:
   a mechanical cam lobe driven in synchronism with the crankshaft of said loom,
   a detecting means for producing an enabling pulse only when cooperating with said cam lobe,
   a pulse generator which is connected to said detecting means for producing a series of digital pulses of adjustably variable frequency only when cyclically enabled by said detecting means,
   a number of series-connected decade pulse counters, whose first counter is series-connected to said pulse generator and whose parallel output pin-selectable conductors form the vertical components of a conductor matrix, the horizontal components of which are in turn formed from a pin-selectable number of conductors comprising the inputs of a pre-determined group of digital logic gates whereby a set of logic signals from said gates operate a set of control/drive circuits connected directly to the loom components to thus control specific cyclic events in said loom by the pin-selected values designated in said conductor matrix.

2. A device according to claim 1 wherein the referenced cycle is the electromechanical woof-insertion operational cycle of said pneumatic/projection loom.

3. A device according to claim 1 wherein said digital logical gates, whose input conductors form the horizontal component of said conductor matrix, comprise a bistable memory latch circuit.

4. A device according to claims 1 or 2 wherein said pin-selected values are discrete milliseconds as derivable in accordance with both the variable pulse rate of said pulse generator and the counting scheme of the totalizer which consists of said series-connected decade pulse counters.

5. A device according to claims 1 or 2 which further comprises a mechanically loom-synchronized woof-thread brake, a detecting means cooperating with said brake for the purposes of outputting an appropriate signal in accordance with said brake's release of said woof-thread, and a network of digital logical gates whose inputs include the output of said detecting means as well as pin-selectable output conductors forming part of the horizontal component of said conductor matrix.

* * * * *